United States Patent [19]

Matsuzaki

[11] Patent Number: 5,060,091
[45] Date of Patent: Oct. 22, 1991

[54] APPARATUS AND METHOD FOR HARD DISK TESTING

[75] Inventor: Ryuichi Matsuzaki, Narashino, Japan
[73] Assignee: Seiko Seiki Kabushiki Kaisha, Japan
[21] Appl. No.: 335,829
[22] Filed: Apr. 10, 1989

[30] Foreign Application Priority Data

Apr. 12, 1988 [JP] Japan .................................. 63-89995

[51] Int. Cl.$^5$ .......................... G11B 21/02; G11B 5/02
[52] U.S. Cl. ..................................... 360/78.04; 360/31
[58] Field of Search ................... 360/77.07, 77, 75, 31; 324/212

[56] References Cited

U.S. PATENT DOCUMENTS

| | | | |
|---|---|---|---|
| 4,754,343 | 6/1988 | Cascio, Sr. et al. | 360/31 |
| 4,796,109 | 1/1989 | Sordello et al. | 360/31 |
| 4,872,071 | 10/1989 | Easton et al. | 360/31 |

*Primary Examiner*—Vincent P. Canney
*Attorney, Agent, or Firm*—Bruce L. Adams; Van C. Wilks

[57] ABSTRACT

Hard disk testing apparatus and method having a plurality of heads mounted on a carriage capable of moving in the direction of a hard disc at intervals defined by dividing the radius of the hard disc, write circuit for writing a test signal through the heads in the hard disc, read circuit for reading a signal written through the heads, and measuring function for measuring a separation between one head of the heads and another head of the heads provided adjacent to the one head based on a shift distance of the another head shifted to read a signal written by the one head. A separation of the heads is accurately measured without a measuring device, and micro adjustment of positions of the heads based on the measured separation is not required. The possibility of double testing of or failure in testing tracks on the border is eliminated, and thereby disc test is efficiently performed.

8 Claims, 5 Drawing Sheets

APPARATUS AND METHOD FOR HARD DISK TESTING

BACKGROUND OF THE INVENTION

The present invention relates to the improvement of a hard disk testing apparatus and method.

In the conventional quality test of magnetic disks such as hard disk (hereinafter called as "disks"), while a head is shifted by a carriage reciprocatively provided in the direction of the radius of a disk, test signals (information) are magnetically written in the surface of the disk, the written signals are read by a magnetic head, and based on the result of reading, several test items such as missing pulse errors, extra pulse errors, etc. are tested.

In order to reduce the testing time in this case, the heads (for example two heads) are fixed to a head mounting board with fixing jigs at intervals obtained by equally dividing the radius of the disk.

The head mounting board is provided at one end of a carriage which is constructed in the manner that it can be reciprocated in the direction of the center of the disk.

Therefore, the whole test for a disk is completed by shifting the head by, for example, a half of the radius of the disk in case there are two heads.

The above-mentioned test is carried out for several thousands tracks (magnetic concentric circles) provided in the disk and the test results are totalized in order to control the quality of disks.

In the conventional disk testing apparatus, several heads are fixed to a head mounting board with fixing jigs at predetermined equal intervals. However because of fixing errors, the heads may not be set at the predetermined intervals. As a result, even if the head is shifted by the predetermined distance, it happens that tracks around the border between the test ranges covered by one head and the other may be doubly tested or may not be tested.

There is another adjusting method in which the separation between the heads fixed to the head fixing board is first measured, and based on the measured separation, the positions of the heads are adjusted by a micro adjusting mechanism. However, even by this method, the same problems may occur because of errors in the micro adjustment mechanism.

SUMMARY OF THE INVENTION

These are objects of the present invention, to provide an apparatus and a method for magnetic disk storage media or hard disk testing in which the separation of a plurality of heads is accurately measured by writing and reading functions of the heads.

According to the present invention, one head is shifted to read a signal written by another head, and the separation between these heads is measured based on the distance in which the head is shifted. As a result, a separation of the heads is accurately measured without a measuring device, and micro adjustment of positions of the heads based on the measured separation is not required.

Since the carriage is controlled based on an accurate separation between the heads, the possibility of double testing of or failure in testing tracks on the border is eliminated, and thereby disk testing is efficiently performed.

DETAILED DESCRIPTION OF THE PREFERRED EMBODIMENT

The present invention is hereunder described with reference to the drawings of an embodiment.

Figure 1:
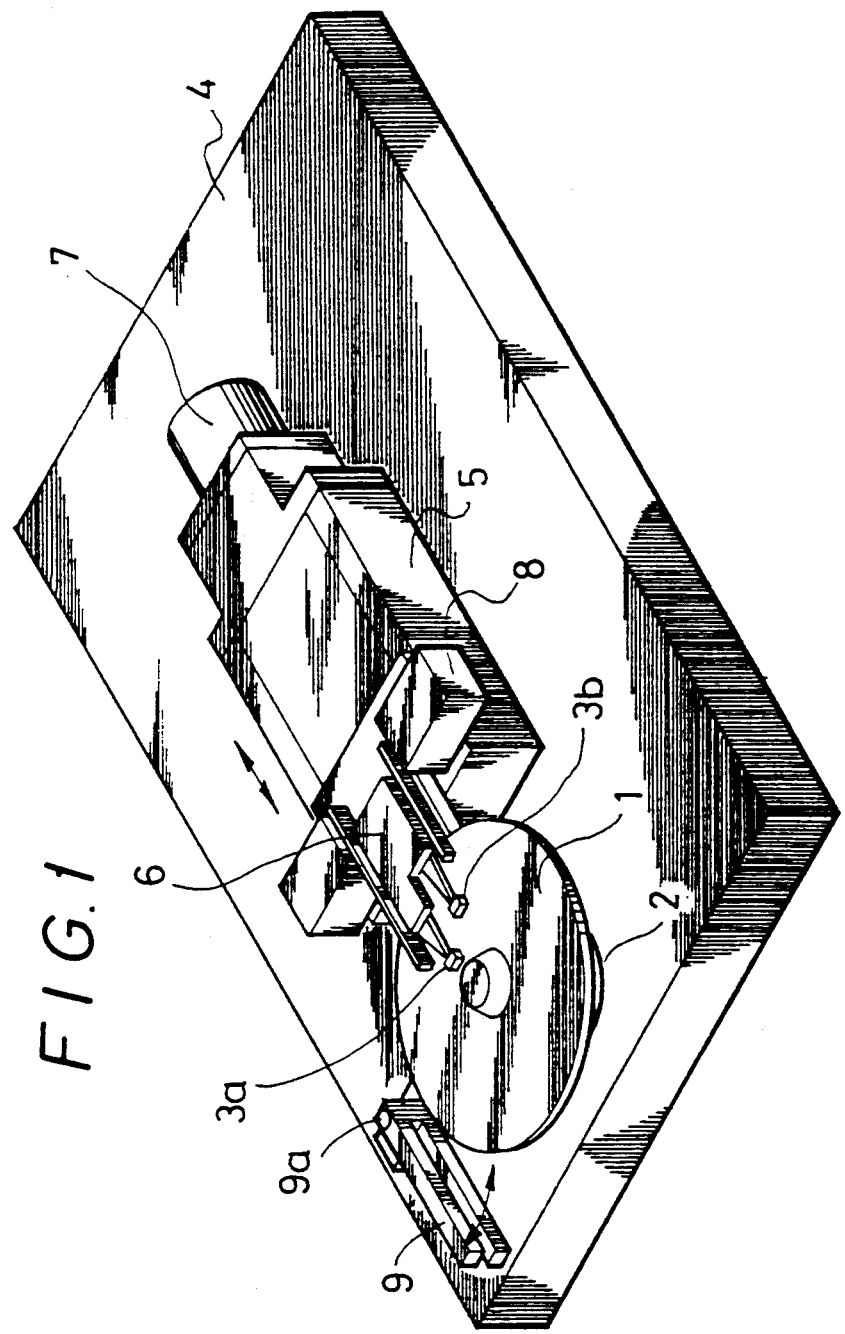
FIG. 1 is a perspective view of an apparatus according to the present invention.

FIG. 1 is a perspective view of an apparatus of the present invention. A disk 1 is mounted on a rotation spindle 2 and is rotated at a predetermined revolution speed.

Heads 3a and 3b are screwed to a head mounting board 6 provided at one end of a carriage 6. The separation between the heads 3a and 3b is about a half of the radium of the disk 1. Since the heads 3a and 3b are provided respectively on the side of the inner periphery and on the side of the outer periphery of the disk, the heads 3a and 3b may hereunder be called respectively the inner head and the outer head.

The carriage 5 is reciprocated by a servomotor in the direction of the center of the disk 1. Accordingly, only by shifting the carriage by half the radius of the disk 1, the head 3a moves in the inner half of the radius of the disk 1 and the head 3b moves in the outer half of the radius whereby the shifts of the heads cover all the surface of the disk 1.

During test, the heads 3a and 3b are positioned closely over the surface of the disk 1 by a head loading mechanism 8. When a test is not carried out, for example when the carriage 5 is retracted on completion of a test, the heads are put away from the surface of the disk 1.

A U-shape magnet 9 is provided for demagnetizing the whole disk 1. The disk 1 is demagnetized by the operation in which the U-shape magnet is swung around a pivot 9a toward the center of the disk 1 while the disk 1 is rotated.

Although the figure does not show, other heads are provided at the back of the disk 1 at positions corresponding to those of the heads 3a and 3b, by means of which the backside of the disk 1 is tested. Therefore the test for both sides of the disk 1 is completed with one reciprocation of the carriage 5.

Figure 2:
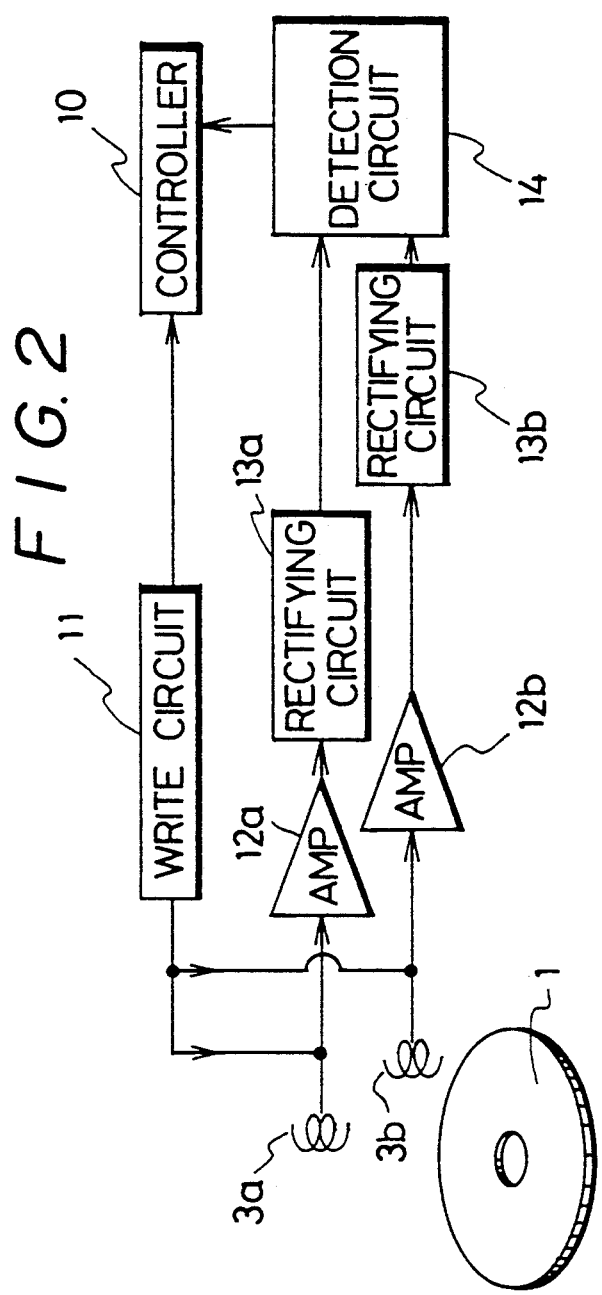
FIG. 2 is a block diagram of an electrical composition of the present invention.

FIG. 2 is a block diagram showing an electrical composition of an apparatus of the present invention. A controller 10 in the figure includes a CPU, a ROM storing a system program, and a RAM storing a working memory thereby totally controlling the whole apparatus.

Predetermined test signals are provided by a write circuit 11 in response to a command from the controller 10, and are transferred through the heads 3a and 3b to the disk 1 and recorded therein.

The heads 3a and 3b read the recorded test signals or signals remaining after erasure from the disk 1, and the signals read are amplified by amplifying circuits 12a and 12b. The amplified signals (waveforms) are rectified by rectifying circuits 13a and 13b, and thereafter compared with predetermined threshold levels at a detection circuit 14 for testing several test items.

A separation (distance) between the heads 3a and 3b is computed by the controller 10 based on output signals provided by the detection circuit 14. When the carriage 5 is moved toward the center of the disk during the test, a write signal written by the inner head 3a is detected by the outer head 3b. Namely, based on signals provided by an encoder (not shown in the figure) directly coupled with the servomotor 7, the controller 10 computes a distance in which the carriage 5 is shifted between a point where the signal is written by the inner head 3a and a point where the written signal is read by the outer head 3b.

The control operation of measuring a separation between the heads 3a and 3b is hereunder described with reference to flow charts shown in FIG. 3 and FIG. 4, and a read characteristic curve in FIG. 5.

Figure 4:
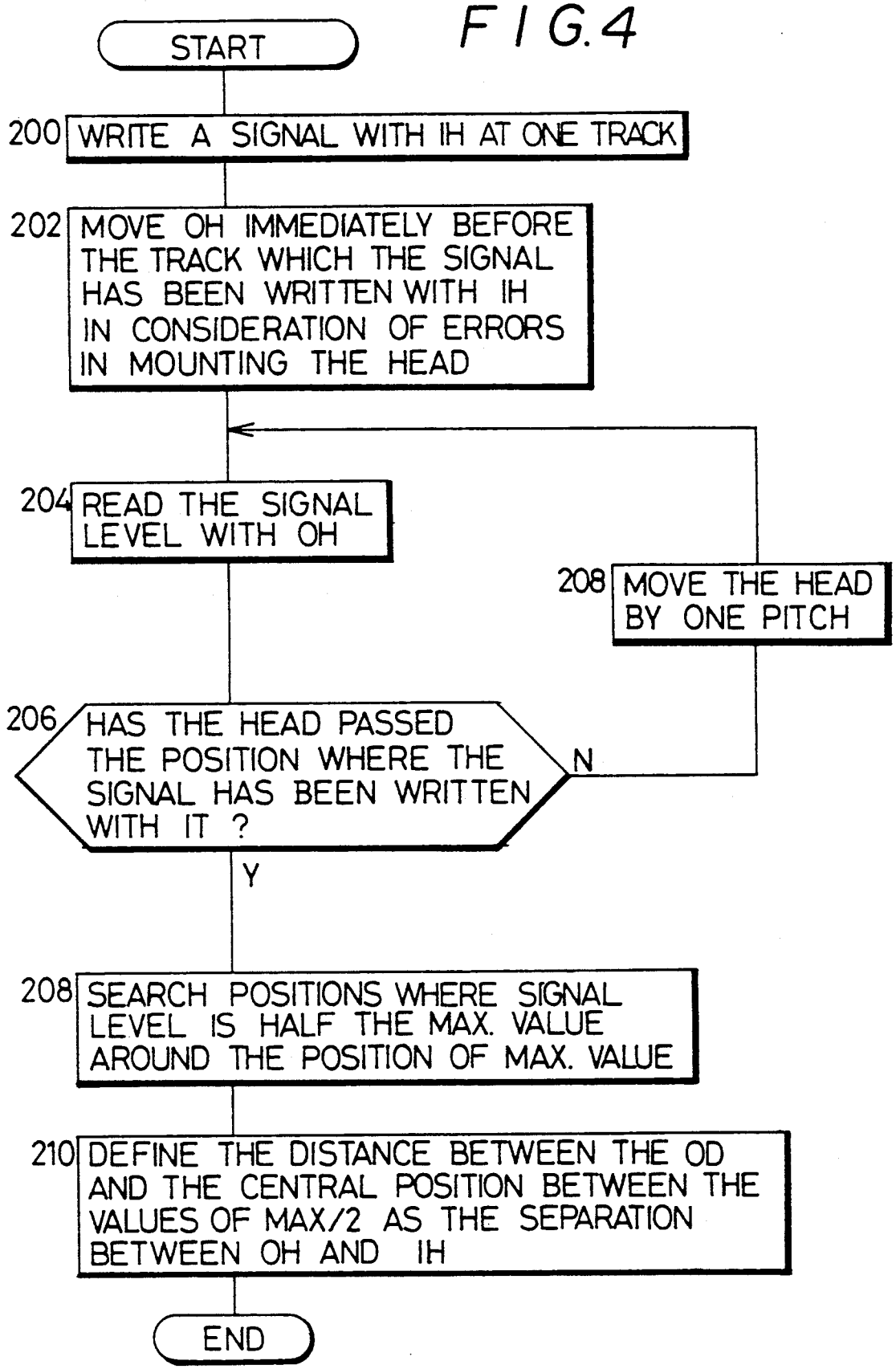
FIG. 4 is a flow chart showing a measurement of heads separation of the present invention.
Figure 5:
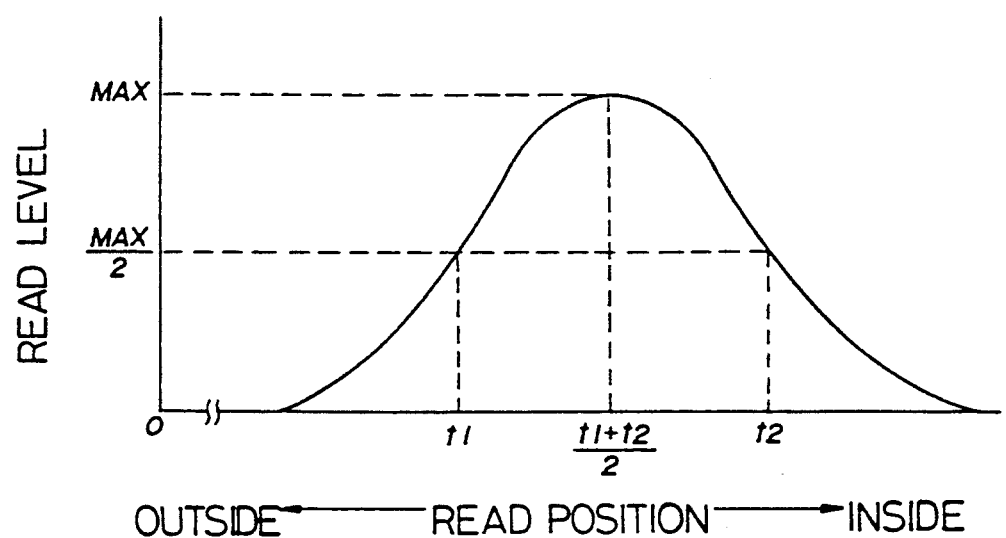
FIG. 5 shows a read characteristic curve of the present invention.

The flow chart in FIG. 4 describes an operation of measuring a separation between the heads according to the present invention. This operation is combined in an operation of measuring a calibration coefficient which is carried out periodically or prior to the commencement of daily test of disks.

The calibration coefficient is a coefficient used for correcting results of actual measurement by the heads to values which may be obtained by measuring a reference disk with a reference head of a reference testing apparatus. In other words, in order to obtain correct measurement results, deviations in the apparatus, heads, and disks, and deviations in outputs caused by magnetic powder adhered to the heads are corrected by the calibration coefficient.

Now, the disk 1 is placed on the revolution spindle 2, and the carriage 5 moves to a position where the outer head 3b comes to the outer most periphery of the disk 1. When the head loading mechanism 8 has come down, and the spindle 2 rotates at a predetermined revolution speed, FIG. 3 (STEP 100), the magnet 9 is rotated around the pivot 9a toward the center of the disk 1 and is returned to its original position thereby demagnetizing the disk 1 (STEP 102).

Thereafter, the carriage 5 moves to an extent that the outer head 3b comes to the outer most periphery of the measuring range of the disk 1 (hereinafter referred to as "the track on the outer most periphery") (STEP 104), a predetermined write signal provided by the write circuit 11 is written in the track on the outer most periphery of the disk 1, and the written signal is read by the outer head 3b. After the read signal is processed by the amplifying circuit 12b and the rectifying circuit 13, it is transformed to the detection circuit 14.

The detection circuit 14 compares the signal with a reference signal at a reference level, and the controller 10 includes the means to calculate a calibration coefficient for the outer head 3b based on the result of the comparison (STEP 106).

During the measurement to obtain the calibration coefficient for the outer head 3b, the inner head writes a predetermined write signal provided by the write circuit 11 in a track which comes in the central portion of the radius of the disk 1. The signal is used as a reference signal for measuring the separation between the heads 3a and 3b (STEP 108, STEP 200 in FIG. 4).

The detail of STEP 108 is shown in FIG. 4, and it will be described later.

When the carriage 5 moves toward the disk 1 and arrives at a position where the inner head 3a comes to a track on the inner most periphery of the measuring range of the disk 1 (STEP 110), measurement to obtain a calibration coefficient is carried out in the same manner as the measurement carried out by the outer head 3b (STEP 112).

Figure 3:
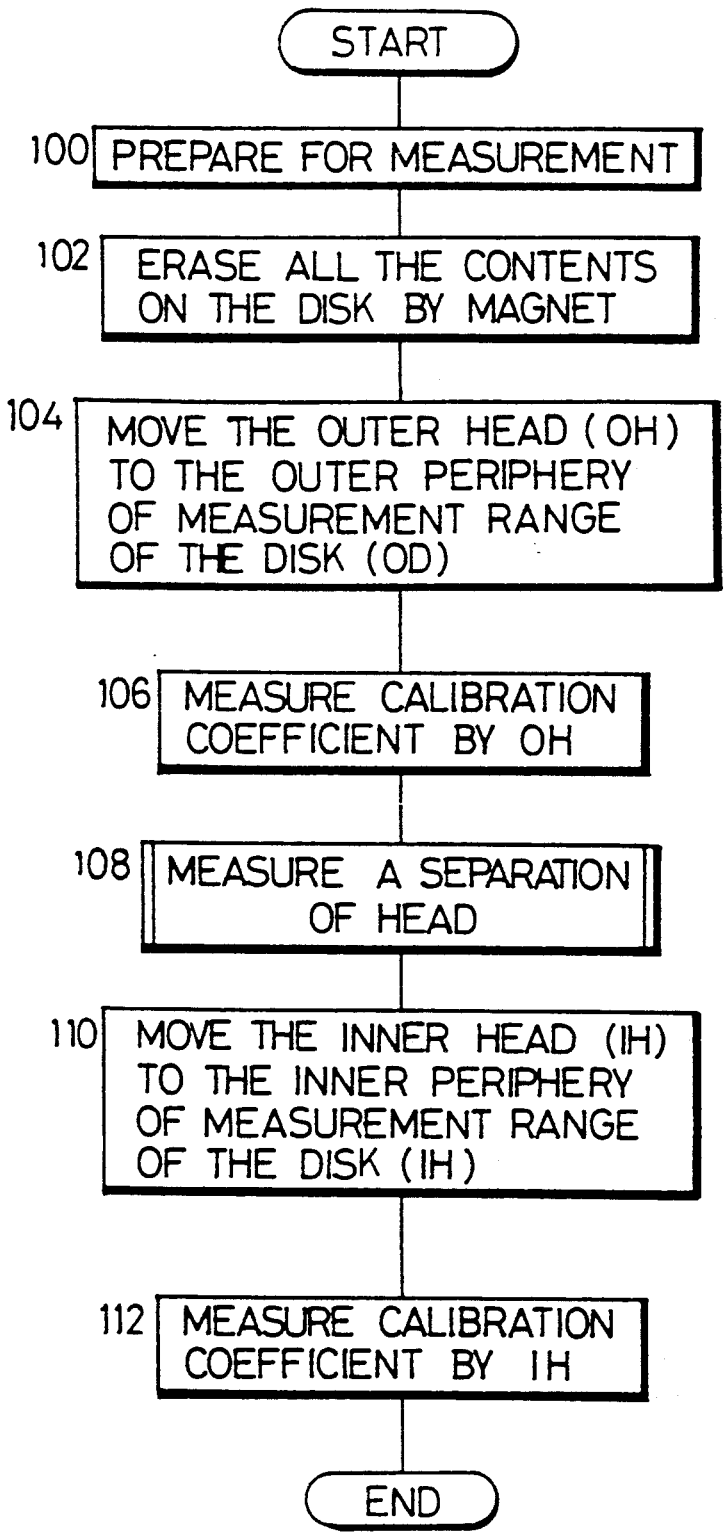
FIG. 3 is a flow chart showing a control operation of the present invention.

A separation between the heads 3a and 3b is measured using the signal written by the inner head 3a in STEP 108 as shown in FIG. 3.

When the outer head 3b writes a signal in the track on the outer most periphery in STEP 106 as shown in FIG. 3, the inner head 3a writes a signal in a track which comes in the middle of the radius of the disk 1, and a data of the position provided by the encoder is stored in the controller 10 (STEP 200).

As the carriage 5 moves toward the center of the disk 1, the outer head 3b starts reading the signal written by the inner head 3a (STEP 202, 204). As shown in FIG. 5, the level of the signal written by the inner head 3a should have a Gaussian distribution with the central portion of the curve being the highest. In practice, however, the highest portion of the curve is flat, and the curve is defective and deformed. Therefore it is difficult to detect the center of the curve based on its maximum level.

In consideration of the above, the carriage 5 is moved by an extra distance after the outer head passes the track in which the signal has been written by the inner head 3a (NO in STEP 206, 208). The signal read by the outer head 3b is amplified by the amplifying circuit 12b, and then the waveform of the signal is rectified by the rectifying circuit 13b whereby an output having the characteristic curve as shown in FIG. 5 is obtained.

Although the curve shown in the figure is presented as having one maximum value (MAX. value) for the convenience of explanation, in practice, the top of the curve is flat.

Positions $t_1$ and $t_2$ where signal levels are at half the level of the maximum output are obtained (STEP 208), the intermediate position $(t_1+t_2)/2$ is calculated, and this position is determined as the position at which the signal is written by the inner head 3a. A separation between the heads 3a and 3b is obtained based on a shift distance in which the carriage 5 moves the outer head 3b between this position and the outer most periphery of the measuring range whose position data is stored in the controller 10 (STEP 210).

As described in the foregoing, the outer head 3b is shifted to read a signal written by the inner head 3a, and the characteristic curve of the signal read is processed thereby detecting the center of the written signal. Because of this feature, a separation between the heads 3a and 3b is accurately measured.

Since a separation between the heads 3a and 3b is accurately figured out, operation of the carriage 5 controlled based on this separation prevents double testing of or failure in testing tracks on the border between the outer and inner measurement ranges thereby efficiently performing a disk test.

Moreover, since the measurement of separation of the heads is carried out simultaneously during the measurement for a calibration coefficient which is performed prior to a test, troublesome micro adjustment of the heads is not required, and thus the time required for changing the heads is reduced.

Although only two heads 3a and 3b are provided in the above embodiment, it is possible to use three or more heads.

Further, although the heads are moved from the outer periphery to the inner periphery of the disk during the measurement of separation of the heads, it is also possible to measure the separation by moving the head from the inner periphery to the outer periphery.

According to the present invention, the outer head is shifted to read a signal written by the inner head, and a separation between the heads is measured based on the distance in which the head is shifted. As a result, a separation of the heads is accurately measured without a measuring device, and micro adjustment of positions of the heads based on the measured separation is not required.

Since the carriage is controlled based on an accurate separation between the heads, the possibility of double testing of or failure in testing tracks on the border is eliminated, and thereby disk testing is efficiently performed.

What is claimed is:

1. An apparatus for hard disk testing comprising:
    a plurality of heads mounted on a carriage capable of moving in the direction of a hard disk at intervals defined by dividing the radius of said hard disk, wherein each of the heads corresponds to annularly divided test regions;
    write means for writing a test signal including a separation test signal through said plurality of heads in said hard disk;
    read means for reading the test signal including the separation test signal written through said heads;
    measuring means for measuring a separation between a first head of said heads and a second head of said heads provided adjacent to said first head based on a shift distance of said second head by shifting said second head to read the separation test signal written by said first head; and
    control means for controlling the shift distance and testing position of said heads to maintain said heads in corresponding annularly divided test regions without entering into adjacent annularly divided test regions.

2. A method for hard disk testing using a plurality of heads mounted on a carriage capable of moving in the direction of a hard disk at intervals defined by dividing the radius of said hard disk, comprising the steps of:
    writing a separation test signal in a track of said hard disk by a first head of said heads;
    shifting a second head of said heads immediately before the track in which the separation test signal has been written by said first head;
    reading the separation test signal by said second head in every one pitch repeatedly by shifting said second head;
    checking for a maximum value position of the separation test signal which has been read by said second head;
    searching for positions where the separation test signal level is half the maximum value around the maximum value position; and
    defining a distance between an initial position of said second head and a central position between the positions where the signal level is half the maximum value as a separation between said first head and said second head.

3. An apparatus for testing a magnetic disk, comprising: a plurality of heads with at least a first head and a second head mounted on a carriage for testing separate regions of the magnetic disk; recording means including the first head for recording a separation test signal at a location on the magnetic disk when said carriage is at an initial first position; reading means for detecting the recorded separation test signal and generating a signal level signal in response thereto; controllable moving means for moving said carriage to a second position in response to the signal level signal to thereby position the second head at the location of the recorded separation test signal, and for moving said carriage during testing of the magnetic disk; and control means responsive to the signal level signal for determining the separation distance between the first head and the second head based on movement of the carriage from the first to the second position and for controlling the moving means in accordance with the determined separation distance so that the first head and the second head test separate regions of the magnetic disk.

4. An apparatus for testing a magnetic disk according to claim 3; wherein the separation test signal has a maximum value and said reading means detects equal fractions of maximum recorded separation test signals located on either side of the location of the maximum value and generates the signal level signal in response thereto; and said control means includes means for determining the second position based on a central position between the locations of the fractions of maximum recorded separation test signals.

5. An apparatus for testing a magnetic disk according to claim 3; wherein said reading means includes the second head.

6. An apparatus for testing a magnetic disk according to claim 3; wherein said plurality of heads includes plural heads positioned to test the obverse side of the magnetic disk and plural heads positioned to test the reverse side of the magnetic disk.

7. An apparatus for testing a magnetic disk according to claim 3; wherein said plurality of heads includes an outermost head corresponding to an outermost measuring range of the disk and being operable for writing a predetermined write signal, reading the written write signal and producing an output in response thereto; said control means includes means for determining a correlation coefficient during a calibration measurement; and said recording means includes write circuit means for providing the write signal; whereby during the calibration measurement, said carriage is positioned so that the outermost head is at an outermost periphery of the outermost measuring range, and the write signal is written on said periphery and read by the outermost head which produces the output for use in determining the correlation coefficient.

8. An apparatus for testing a magnetic disk according to claim 3; wherein said plurality of heads includes an innermost head corresponding to an innermost measuring range of the disk and being operable for writing a predetermined write signal, reading the written write signal and producing an output in response thereto; said control means includes means for determining a correlation coefficient during a calibration measurement; and said recording means includes write circuit means for providing the write signal; whereby during the calibration measurement, said carriage is positioned so that the innermost head is at an innermost periphery of the innermost measuring range, and the write signal is written on said periphery and read by the innermost head which produces the output for use in determining the correlation coefficient.

* * * * *